TELEPHONE SECURITY SYSTEM

Filed Nov. 17, 1960 2 Sheets-Sheet 1

INVENTOR.
T. B. NORLING
BY J. Warren Whitesel
ATTORNEY

July 23, 1963 T. B. NORLING 3,098,901

TELEPHONE SECURITY SYSTEM

Filed Nov. 17, 1960 2 Sheets-Sheet 2

United States Patent Office 3,098,901
Patented July 23, 1963

3,098,901

TELEPHONE SECURITY SYSTEM

Thomas B. Norling, Chicago, Ill., assignor to International Telephone and Telegraph Corporation Filed Nov. 17, 1960, Ser. No. 70,024
15 Claims. (Cl. 179—175.2)

This invention relates to wire-line communication systems and more particularly to telephone security systems. As used herein the term, "telephone security system," means a system which detects trouble on important wire-lines especially, although not exclusively, wire-lines used as part of a communication channel. An example of a line requiring such service is one which provides communication to sentry or guard posts near important military installations. Other examples of wire-lines requiring security service will readily occur to those skilled in the art.

There are many troubles which may occur on such lines; however, a trouble which is especially pertinent to this invention is the type which occurs when someone tampers with a line. First, there is the obvious situation where a foreign espionage agent or other malicious person wishes either to cut a telephone line to prevent a guard or sentry from sounding an alarm in time of crisis or to tap a line for monitoring conversations and other messages carried by the line. Then, there are careless persons who may cut a line as a result of inattention, personal convenience, or the like, such as cable splicers who mistakenly cut a wrong pair among a large number of telephone lines. Finally, there are users of a system who deliberately disable their own equipment to accomplish a selfish aim. For example, unscrupulous persons may be tempted "accidentally" to leave a receiver or handset off-hook, thereby avoiding a call to duty.

Quite obviously, any of these or similar events could spell disaster to the entire military installation; therefore, it is desirable to provide means for maintaining a surveillance over each of these lines to detect any unauthorized tampering with them. In the past, attempts have been made to utilize the talking battery connections of a telephone line for providing a continuous D.C. loop which could be monitored by test equipment. But this system did not prevent wire tapping or disconnection of ringers and caused an unduly large drain on the common office battery. Moreover, this system caused the common battery to become noisy, thus reducing the overall efficiency of the entire telephone system. In other systems, telegraph-type polar relays were used in connection with closed loop conditions. But these relays are difficult to adjust originally and require repeated adjustments because line impedance drifts with changing environmental and aging conditions, thereby requiring the continuous services of trained personnel. Most places which require security systems of the type described are manned by technically unskilled persons. For example, at military posts, the security system may be manned by a corporal of the guard who has no technical training whatsoever.

Accordingly, an object of this invention is to provide new and improved telephone security systems and more particularly to provide novel systems which maintain substantially constant surveillance over the telephone lines to detect all non-standard conditions. In this connection, it is an object to provide these functions without in any way interfering with the telephone service normally given over such lines. Still another object is to provide these functions without requiring any substantial modification of existing telephone equipment.

A further object is to detect unauthorized tampering with telephone lines. Another object is to detect when a line is destroyed or monitored. A more particular object is to sound an alarm if a line is cut and to burn-out or detect any pickup attachments connected to the line. A further object is to discourage careless persons from damaging a line through inattention or neglect. In this connection, it is an object to apply a line voltage which is high enough to administer a relatively strong electrical shock to a person touching or cutting the line without actually injuring him, thereby teaching him to avoid future contact with the line. Yet another object of this invention is to detect when users of a system disable their own equipment. More specifically, it is an object to give an alarm if a telephone set is in a prolonged off-hook condition.

In accordance with one aspect of this invention, a telephone security system comprises a plurality of multi-conductor subscriber lines which extend from a command post or other central location to a plurality of remote locations. A source of relatively high voltage, low frequency alternating current is connected to one conductor of the line leading to the remote location and an A.C. relay is connected to the other conductor of the line. Thus, the A.C. relay is operated by the alternating current when applied via a closed A.C. loop including the line extending to the remote location. If the line is cut or a subset is left off-hook, the A.C. relay restores to give an alarm.

In carrying out this invention, the frequency of the alternating current is made too low to actuate a receiver at an assocated substation and too high to cause its ringer to sound. Also, the A.C. source produces a relatively high potential which is sufficient to burn-out any high impedance, low current drain pickups which may be attached to the line and to administer a relatively severe shock to persons touching or cutting the line. Thus, repairmen, cable splicers and the like soon learn to be very careful and avoid cutting or otherwise interfering with the lines which are included with in the security system. If low impedance, high current drain pickups are used to monitor the line, a current sensitive device is actuated to give an alarm.

The above mentioned and other features and objects of this invention and the manner of obtaining them will become more apparent and the invention itself will be best understood by making reference to the following description of an embodiment of the invention taken in conjunction with the accompanying drawings wherein:

FIGS. 2 and 3 are joined to provide a complete circuit diagram.

BRIEF DESCRIPTION

Figure 1:
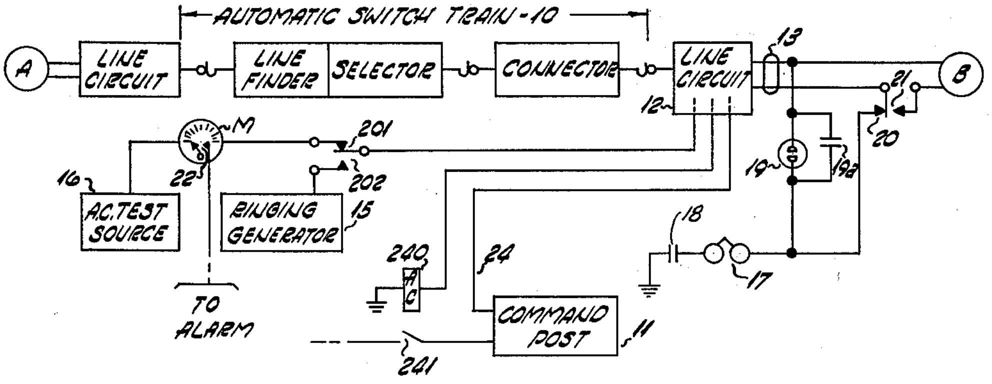
FIG. 1 is a block diagram showing a telephone system incorporating the invention.

As shown in FIG. 1, a telephone system incorporating this invention includes a conventional automatic switch train 10 which interconnects a plurality of remotely located subscriber stations. At a convenient central point is a command post 11 having means for giving alarm signals if any of the subscriber lines included within the security system are broken, either by being cut or by having a receiver or handset left off-hook. Also located at the command post are means for testing and for disabling the lines as long as trouble conditions exist.

While the automatic switch train is shown as the well known step-by-step type including linefinder, selector, and connector equipment, it should be understood that the principles of the invention may be incorporated into any communication or other system including wire-lines, without regard as to whether conventional switching equipment is or is not used. Moreover, as here shown, the telephone security system is connected into a line circuit 12 of a monitored line 13; however, it should be understood such connections may be made at other points also.

Specifically, the line circuit includes a ringing generator 15 tuned to conventional ringing frequencies and also a source 16 of high voltage, low frequency, alternating current. Normally the A.C. source 16 is connected to one conductor of the line 13 via contacts 201. An A.C. relay 240 is connected to the other side of the line 13 to detect the A.C. by operating when the line is a closed A.C. loop. This AC loop is completed at the subscriber station by a bridge including a tuned ringer 17, a capacitor 18 and a neon lamp 19 normally connected across the conductors of the subscriber line 13 by way of hookswitch contacts 20. The neon lamp 19 is by-passed at ringing frequencies by a parallel connected capacitor 19*a*. Thus, the A.C. relay 240 releases if the line 13 is cut or otherwise opened, as when the hookswitch contacts 20 are not properly closed.

While any suitable A.C. source may be used, source 16 preferably has a frequency which is different from the frequency of ringing generator 15 by an amount sufficient to prevent response by the ringer 17. Thus, in one exemplary system, the generator 15 was tuned to provide an output of 25 cycles per second which caused the ringer 17 to sound and the A.C. source 16 was tuned to provide an output of 66 cycles per second which caused no response at the ringer 17. The output of the A.C. source 16 preferably has a potential which is high enough to administer a relatively strong shock to persons touching or cutting the line 13 without actually injury them.

A first advantage resulting from this use of a high potential A.C. source is that maintenance personnel who must service the telephone system will known of the high voltage on line 13 and, therefore, will be extremely careful when working on adjacent conductors. Moreover, if the line 13 is inadvertently cut, the resulting shock to the person cutting the line immediately informs him of the fact and he will quickly repair the line. Another advantage resulting from this use of a high potential A.C. source is that the pickups of any high impedance, low current drain monitoring devices connected to line 13 will be burned out, thus discouraging surreptitious wire tapping. If, to avoid this problem, a low impedance, high current drain pickup is used, the resulting current flow causes meter M associated with source 16 to give a reading which indicates the presence of the monitoring equipment. If necessary, the meter M may be arranged to close contacts 22 and give an alarm when the current drain increases beyond a normal amount.

To prevent the A.C. from causing crosstalk on other lines, the output of the source 16 is preferably in the form of a low distortion sine wave approaching a pure sine wave having a frequency lower than the lowest frequency that can actuate a receiver at subset B. More specifically, the subset network B is of conventional design, and includes a receiver adapted to reproduce as audible signals all electrical currents falling in the frequency spectrum including approximately 250–3000 cycles per second. Hence with the 66 cycles per second used in the exemplary system, there will be no response at the receiver of subset network B and any crosstalk occurring as a result of the applied current has no effect at other receivers either. An advantage resulting from this use of a pure sine wave is that there are no higher harmonics which could cause crosstalk in the 250–3000 c.p.s. range.

DETAILED DESCRIPTION

Figure 2:
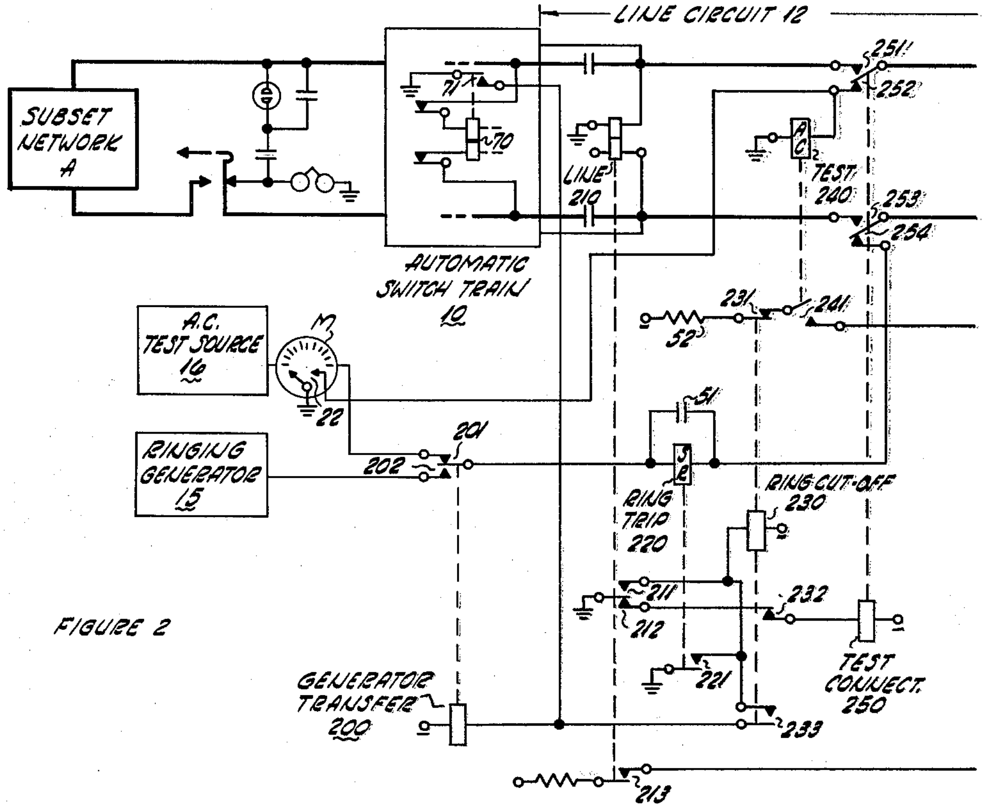
FIGS. 2 and 3 are schematic circuit diagrams showing details of the invention.
Figures 3, 4:
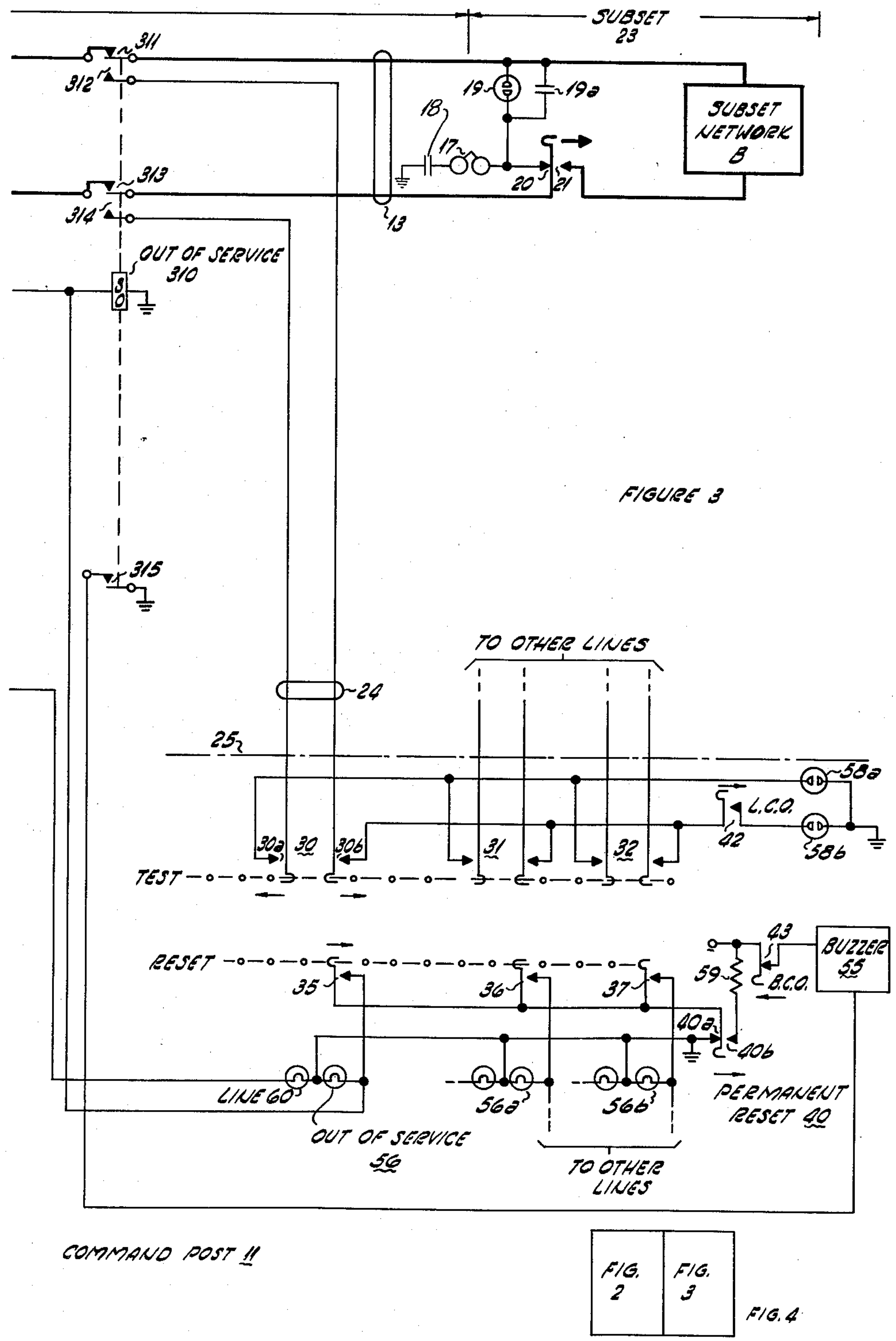
FIG. 4 shows how

It is thought that the details of the invention may be understood better by making reference to FIGS. 2 and 3 which show the relay circuitry incorporated in the telephone security system. These figures include only those components which are necessary for an understanding of the invention. For example, line circuits are very well known, and it will be immediately apparent to those skilled in the art that line, cut-off and lockout relays may be included, as required. Moreover, a connector in switch train 10 includes the equipment necessary to seize line 13 and apply ringing current thereto.

*Circuit Components*

As shown in FIGS. 2 and 3, a remotely located subset 23 is connected to central office equipment by way of the line 13 and to the centrally located command post 11 via line 24. The command post in shown in FIG. 3 beneath the dot-dashed line 25.

The line circuit 12 includes a generator transfer relay 200 for selecting between a conventional ringing generator 15 and an A.C. source 16. A line relay 210 supplies talking battery and operates responsive to the receipt of off-hook supervision. A ring trip relay 220 is series connected between the generator 15, source 16 and line 13 to operate on a D.C. basis responsive to off-hook supervision. It does not respond to A.C. from the ringing generator 15 or the source 16. Ring cut-off relay 230 and test connect relay 250 are slaves of ring strip relay 220 and actually complete the function of applying A.C. currents to or removing them from the line and of completing the talking circuit (the heavily inked conductors). A test relay 240 which operates responsive to A.C. from source 16 is the means for detecting closed A.C. loop conditions. An out-of-service relay 310 disconnects the subscriber station 23 from the central office equipment and connects it to the command post 11 via conductors 24 if trouble occurs on the line.

At the command post 11 are a number of line test keys 30–32, each of which is individual to a subscriber line. Operation of one of these keys tests the associated line to determine whether there is a potential on it. Also, individually associated with each line is a reset key 35–37 which restores the out-of-service relay 310 after a test ie completed. If a permanent reset key 40 and an individual reset key 35–37 are operated simultaneously, the out-of-service relay 310 is held operated and the associated line is removed from service until the fault is corrected.

*Circuit Operation*

With the foregoing description of the circuit components in mind, it is thought that the invention may be understood best by the following description of the manner in which the circuit operates.

*Testing.*—Means are provided for testing a line when it is idle. More specifically, during non-trouble, idle line conditions, relays 200, 210, 220, 230 and 310 are released. Relay 250 is operated over a circuit including contacts 212, 232. With this condition, the closed A.C. loop circuit may be traced from A.C. test source 16 through contacts 201, a capacitor 51 which is an A.C. short around the winding of slow-release ring trip relay 220, contacts 254, 313, hookswitch contacts 20, neon lamp 19, contacts 311, 252 and the winding of A.C. test relay 240 to ground. Relay 240 operates and the neon lamp 19 lights. Ring trip relay 220 does not operate because it responds to D.C. only. An advantage of this arrangement is that lamp 19 goes out to remind a person at subset 23 when the phone is off-hook. Moreover, a person is constantly reminded by a lighted lamp 19 that his line is monitored; therefore, he is not tempted to leave his phone off-hook to avoid a call to duty.

In carrying out this invention, the line 13 is disabled when trouble is indicated. That is, if the A.C. loop is broken or if hookswitch contacts 20 are opened, test relay 240 restores. Also, if the line draws an excessive amount of current, as when the line is tapped, the meter M gives a high reading, contacts 22 close, A.C. relay 240 is shunted and releases. In either event, the release of relay 240 restores the contacts 241 and out-of-service relay 310 operates over a circuit traced from battery through resistor 52, contacts 231, 241 and the winding of relay 310 to ground. When out-of-service relay 310 operates, contacts 311, 313 open to prevent voice transmission over the line 13 to the central office, thus disabling the line. Contacts 312, 314 close to extend the conductors of the line 13 to the command post 11. Also responsive to the operation of relay 310, contacts 315 close thereby sounding buzzer 55 at command post 11 over a circuit which may be traced from ground on contacts 315 through buzzer 55 and buzzer cut-off key 43 to battery. An advantage of this arrangement is that a subscriber at the subset 23 cannot talk over the line 13 while monitor equipment is connected to it.

To test the line, a person at the command post 11 hears the buzzer 55, observes a bank of lamps, and sees that an out-of-service lamp 56 is in a lit condition. This lamp is individually associated with the troubled line. The circuit for lighting this lamp may be traced from battery through resistor 52, contacts 231, 241, the filament of lamp 56, and ground on permanent reset key contacts 40*a*. The resistance of the lamp 56 filament is high enough to avoid interference with the operation of relay 310. If some other line were in a trouble condition, a different one of the lamps such as 56*a*, 56*b*, would be lit. After observing the bank of lamps, the person at the command post operates the test key 30 individually associated with the lit lamp 56. If a battery or an alternating current is applied to either side of line 13, a circuit is completed over conductors 24 and through contacts 30*a*, 30*b* to light one of the neon lamps 58*a*, 58*b*.

After the test, the person at the command post may decide to lock the line 13 out of service. To do this, he operates both the permanent reset key 40 and the individual line reset key 35. Responsive thereto, a circuit is completed from battery through resistor 59, contacts 40*b*, 35, and the winding of out-of-service relay 310 to ground, and through the filament of lamp 56 to ground. In this condition, relay 310 is locked in an operated condition, contacts 311, 313 are held open to prevent the transmission of messages over line 13. A line crew may be sent to inspect line 13 and correct the trouble conditions, after which the line is returned to service by opening key contacts 35, 40*b*, and releasing relay 310. Relief may also be sent to support a guard at the post served by subset 23, if necessary.

On the other hand, if the test does not indicate a permanent trouble, contacts 35 are closed momentarily and contacts 40*b* are left open. Under these conditions, a circuit may be traced from ground through contacts 40*a*, 35 and the winding of out-of-service relay 310 to ground. Relay 310 is shunted, thus restoring to close contacts 311, 313 and reconnect the A.C. test relay 240 to the line. If the trouble has cleared, as when hookswitch contacts 20 close, test relay 240 reoperates and nothing further is done. On the other hand, if a trouble condition continues to be indicated, out-of-service relay 310 reoperates and another signal is transmitted to the command post 11.

*Outgoing call.*—When a subscriber at station B places a call, hookswitch contacts 20 open to release A.C. relay 240 and contacts 21 close to complete a D.C. circuit across the conductors of line 13. When this is done, ring trip relay 220 operates over the D.C. path traced from a battery not shown but superimposed upon the A.C. in the source 16 through contacts 201, relay 220, contatcs 254, 313, line 13, hookswitch contacts 21, subset network B, contacts 311, 252, and the winding of A.C. relay 240 to ground.

Responsive to the operation of ring trip relay 220, contacts 221 close to operate a slave ring cut-off relay 230.

When ring cut-off relay 230 operates, contacts 231 open to prevent the operation of out-of-service relay 310, thus avoiding an indication of trouble conditions during normal calls. The relay 310 is slow to operate so that it will not operate inadvertently at this time after relay 240 restores responsive to the opening of hookswitch contacts 20. Contacts 232 open to break the path to test connect relay 250 which releases. Contacts 233 close to operate generator transfer relay 200 without effect at this time. When test connect relay 250 releases, contacts 251, 253 close to connect the subset 23 to the automatic switch train and the call is completed in any normal manner.

*Incoming call.*—When the line 13 is called, ringing current is applied to the line by the automatic switching equipment in any well known manner. A relay 70 in the automatic switch train is connected across the talking conductors to operate when the ringing current is so applied. Responsive thereto, contacts 71 close thus completing an obvious circuit for operating the generator transfer relay 200. Thereupon, contacts 201 open to remove the A.C. test current and contacts 202 close to apply ringing current to the line 13. Relay 240 is held operated by the ringing current. Since the ringer 17 is tuned to the frequency of the output of generator 15, it sounds and a subscriber at subset 23 responds by closing hookswitch contacts 21 in any well known manner. Thereupon, a D.C. loop is completed for operating ring trip relay 220 and ring cut-off relay 230, and for releasing test connect relay 250. The call is switched through and conversation follows.

It is thought that the advantages of the subject invention will be readily apparent from a study of the foregoing disclosure and the attached drawings. More specifically, the telephone security system maintains a constant surveillance over the guarded lines at all times and detects any non-standard conditions on the lines. Immediately upon detection of such conditions, the line may be tested and if the conditions warrant it, a maintenance crew may be sent to inspect the line and a relief force may sent to support a guard at the guard post served by the trouble line. Moreover, the telephone security system disclosed herein is fully compatible with all equipment normally connected to subscriber lines and therefore may be installed in any conventional telephone equipment without impairing the service normally given and without requiring substantial and expensive modification of such equipment. Moreover, the invention is equally applicable to many other communication systems and may be installed in them also. Finally, the aims of the invention are accomplished in such a manner that it makes no difference how the trouble occurs on the line. Specifically, would-be saboteurs who deliberately tamper with the lines are foiled, careless persons who inadvertently damage a line are taught to exercise caution, and selfish persons are discouraged from "accidentally" disabling their own equipment.

It is to be understood that the foregoing description of a specific example of the invention is not to be construed as a limitation upon its scope.

I claim:

1. A telephone security system comprising a plurality of multi-conductor subscriber lines extending from a central location to remotely located subscriber stations, means at said central location for applying a low frequency voltage, to a first conductor of each of said lines when idle, means connected to another conductor of each of said lines for detecting alternating current caused by said voltage when applied to said lines when a complete alternating current loop is then extended to an associated subscriber station, and means triggered responsive to said last named means detecting an absence of said alternating current for giving an alarm if a call is not then in progress.

2. The telephone security system of claim 1 and means for connecting a meter to measure alternating current drain when said alternating current is applied over said lines, through said complete alternating current loop and means controlled by said meter for giving an alarm if said measured current drain increases substantially when said alternating current is applied to said line.

3. The telephone security system of claim 1 wherein said frequency is lower than the lowest frequency reproduced by any telephone receiver which may be connected to said line.

4. The telephone security system of claim 1 wherein said alternating current is a sine wave with minimum distortion.

5. The telephone security system of claim 1 and means including a neon lamp coupled across said conductors via hookswitch contacts at each of said subscriber stations for coupling said first conductor to said second conductor to transmit said alternating current from said applying means to said detecting means.

6. The telephone security system of claim 1 wherein a telephone ringer is capacitively coupled across said conductors via hookswitch contacts at each of said subscriber stations for coupling said first conductor to said second conductor to transmit said alternating current from said applying means to said detecting means and wherein said ringer is tuned to respond to currents of substantially a first frequency and said alternating current is a frequency which is different than the frequency to which said ringer is tuned.

7. The telephone security system of claim 1 wherein the said voltage is high enough to administer a relatively strong shock to persons touching or cutting the line without actually injuring such persons.

8. A wire-line security system for transmitting alternating current comprising means for applying an alternating current voltage to each line in said system during at least an interval when said line is idle, said alternating current voltage being a low distortion sine wave having a frequency which is lower than a lowest frequency normally transmitted over said line, means for connecting detecting means to said line for detecting said alternating current voltage when applied to said line, means including a meter for measuring current drain over each said line during said intervals when said alternating current is applied thereto, means for completing an alternating current loop to transmit said alternating current from said applying means to said detecting means, a tuned ringer connected to said loop, and means for giving an alarm if said loop is open when said alternating current voltage is applied to said line.

9. The wire-line security system of claim 8 wherein said alternating current has a frequency which is different from the frequency to which said ringer is tuned.

10. A telephone security system comprising central office switching equipment, a plurality of multi-conductor subscriber lines extending from said central office to remotely located subscriber stations, each of said stations including a subset network connected to the associated line, means at said central office for applying a low frequency, low distortion sine wave voltage to a first conductor of each of said lines, means at each of said stations capacitively coupled between said first conductor and a second of said conductors via hookswitch contacts to transmit an alternating current caused by said voltage across said conductors through a complete alternating current circuit, a tuned ringer coupled to said last named means, said alternating current having a frequency which is lower than the lowest frequency reproduced at the subset network connected to said line and higher than the frequency to which said ringer is tuned, means including a meter for measuring alternating current drain over said line during times when said alternating current voltage is applied to said line, means included in said alternating current circuit connected to said second conductor of each of said lines for detecting said alternating current through said line, and means triggered responsive either to said last named means detecting an absence of said alternating current or to said meter detecting a large current drain for giving an alarm.

11. The telephone security system of claim 10 wherein the potential of said alternating current voltage applying means is high enough to administer a relatively strong shock to persons touching or cutting the line without actually injuring such persons.

12. A telephone security system comprising a centrally located command post, a plurality of multi-conductor subscriber lines extending from said command post to remotely located subscriber stations, means for applying a low frequency, voltage to a first conductor of each of said lines, means for completing an alternating current circuit comprising said lines and said voltage applying means, means connected to another conductor of each of said lines for detecting alternating current resulting from said voltage applied to said conductor, means triggered responsive to said last named means detecting an absence of said alternating current for giving an alarm, and means at said command post for testing said line when an alarm is given.

13. The telephone security system of claim 12 and means at said command post for disabling a subscriber line when trouble is indicated on such line.

14. The telephone security system of claim 13 and means at said command post for returning said disabled line to service when said trouble is removed from said line.

15. The telephone security system of claim 12 and means including a meter for measuring alternating current drain over said lines during times when said alternating current voltage is applied to said lines, and means for giving an alarm if said measured current drain increases substantially.

References Cited in the file of this patent

UNITED STATES PATENTS

| | | |
|---|---|---|
| 2,691,698 | Schmidt | Oct. 12, 1954 |
| 2,696,524 | Huntington et al. | Dec. 7, 1954 |
| 2,822,423 | Claesson | Feb. 4, 1958 |
| 2,875,285 | Hightower | Feb. 24, 1959 |
| 2,979,575 | Lehr et al. | Apr. 11, 1961 |